(12) United States Patent
Rubin

(10) Patent No.: US 11,392,827 B1
(45) Date of Patent: Jul. 19, 2022

(54) DEEPER LEARNING FROM THE REAL-TIME TRANSFORMATIVE CORRECTION OF AND REASONING FROM NEURAL NETWORK OUTPUTS

(71) Applicant: THE UNITED STATES OF AMERICA AS REPRESENTED BY THE SECRETARY OF THE NAVY, San Diego, CA (US)

(72) Inventor: Stuart H. Rubin, San Diego, CA (US)

(73) Assignee: United States of America as represented by the Secretary of the Navy, Washington, DC (US)

(*) Notice: Subject to any disclaimer, the term of this patent is extended or adjusted under 35 U.S.C. 154(b) by 1037 days.

(21) Appl. No.: 16/037,683

(22) Filed: Jul. 17, 2018

Related U.S. Application Data
(60) Provisional application No. 62/534,632, filed on Jul. 19, 2017.

(51) Int. Cl.
*G06N 3/08* (2006.01)
*G06N 3/04* (2006.01)

(52) U.S. Cl.
CPC ............ *G06N 3/08* (2013.01); *G06N 3/0454* (2013.01)

(58) Field of Classification Search
CPC ........ G06N 3/08; G06N 3/0454; G06N 3/084; G06N 3/04; G06N 20/00; G06N 3/063; G06N 3/0445; G06N 3/049; G06N 3/0472; G06N 3/10
USPC .......................................................... 706/25
See application file for complete search history.

(56) References Cited

U.S. PATENT DOCUMENTS

| 7,047,226 | B2 | 5/2006 | Rubin |
| 8,073,804 | B1 | 12/2011 | Rubin |
| 8,117,147 | B1 | 2/2012 | Rubin |
| 8,250,022 | B1 | 8/2012 | Rubin |
| 8,280,831 | B1 | 10/2012 | Rubin |
| 8,285,728 | B1 | 10/2012 | Rubin |
| 8,315,958 | B1 | 11/2012 | Rubin |

(Continued)

OTHER PUBLICATIONS

Rubin, Stuart H., "On Randomization and Discovery", Journal of informational Sciences, vol. 177, issue 1, pp. 170-191, Jan. 2007.

(Continued)

*Primary Examiner* — Masum Billah
(74) *Attorney, Agent, or Firm* — Naval Information Warfare Center Pacific; Kyle Eppele; Ryan J. Friedl

(57) ABSTRACT

A method includes providing a set of deep learning neural networks where no pair of deep learning neural networks within the set of deep learning neural networks produces a semantically equivalent output by design. An input to the set of deep learning neural networks is provided, where responsive to the input, one or more of the deep learning neural networks produces an output. The output of the deep learning neural networks is input into a case-based reasoning (CBR) system. The CBR system generates an output responsive to the input received by the CBR system if the input received by the CBR system is known by the CBR system. The output of the CBR system is then determined to be a correct/incorrect output. One of the deep learning neural networks is trained on the correct output if the correct output is specific to the particular deep learning neural network.

20 Claims, 6 Drawing Sheets

(56) References Cited

U.S. PATENT DOCUMENTS

| | | | |
|---|---|---|---|
| 8,447,720 | B1 | 5/2013 | Rubin |
| 8,457,795 | B1 | 6/2013 | Rubin |
| 8,489,648 | B1 | 7/2013 | Rubin |
| 8,655,799 | B1 | 2/2014 | Rubin |
| 8,768,869 | B1 | 7/2014 | Rubin |
| 8,780,195 | B1 | 7/2014 | Rubin |
| 8,862,621 | B1 | 10/2014 | Rubin |
| 8,955,325 | B1 | 2/2015 | Rubin |
| 9,299,025 | B1 | 3/2016 | Rubin |
| 9,330,358 | B1 | 5/2016 | Rubin |
| 9,396,441 | B1 | 7/2016 | Rubin |
| 2015/0134583 | A1* | 5/2015 | Tamatsu ............ G06N 3/08 706/25 |
| 2016/0026913 | A1* | 1/2016 | Moon ............ G06N 3/04 706/25 |
| 2016/0034811 | A1* | 2/2016 | Pau ............ G06N 3/0454 706/20 |
| 2016/0071010 | A1* | 3/2016 | Tian ............ G06N 3/08 706/25 |
| 2016/0110642 | A1* | 4/2016 | Matsuda ............ G06N 3/0454 706/25 |
| 2018/0025271 | A1* | 1/2018 | Sawada ............ G06N 3/04 706/25 |
| 2019/0147350 | A1* | 5/2019 | Bai ............ G06Q 10/067 706/25 |

OTHER PUBLICATIONS

Rubin, Stuart H., "Computing With Words", IEEE Transactions on Systems, Man, and Cybernetics—Part B: Cybernetics, vol. 29, No. 4, pp. 518-524, Aug. 1999.

Rubin, S.H., Murthy, S.N.J., Smith, N.H., and Trajkovic, L., "Kaser: Knowledge Amplification by Structured Expert Randomization," IEEE Transactions on Systems, Man, and Cybernetics—Part B: Cybernetics, vol. 34, No. 6, pp. 2317-2329, Dec. 2004.

Chaitin, G.J., "Randomness and Mathematical Proof," Sci. Amer., vol. 232, No. 5, pp. 47-52, 1975.

Rubin, Stuart H., Chen, S., and Shyu, M., "Field Effect Natural Language Semantic Mapping", IEEE International Conference on Systems, Man, and Cybernetics, vol. 3, pp. 2483-2487, Oct. 5-8, 2003.

Rubin, Stuart H., et ai. "On the role of informed search in veristic computing", 2001 IEEE International Conference on Systems, Man, and Cybernetics, IEEE, Aug. 2002.

Rubin, Stuart H., et al., "Knowledge acquisition from corresponding domain knowledge transformations", IEEE International Conference on Information Reuse and Integration, IEEE, Aug. 2009.

Shen, Y., et al., "Deep Learning with Coherent Nanophotonic Circuits", Oct. 2016, available at https://arxiv.org/abs/1610.02365.

\* cited by examiner

DEEPER LEARNING FROM THE REAL-TIME TRANSFORMATIVE CORRECTION OF AND REASONING FROM NEURAL NETWORK OUTPUTS

CROSS-REFERENCE TO RELATED APPLICATIONS

This application claims the benefit of U.S. Provisional patent application Ser. No. 62/534,632 filed Jul. 19, 2017, entitled "Deeper Learning from the Real-Time Transformative Correction of and Reasoning from Neural Network Outputs", the content of which is fully incorporated by reference herein.

FEDERALLY SPONSORED RESEARCH AND DEVELOPMENT

This invention is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619)553-2778; email ssc_pac_T2@navy.mil. Reference Navy Case No. 106549.

BACKGROUND

Despite the power of deep learning methods, they still lack much of the functionality for realizing strong artificial intelligence. Deep learning lacks ways of performing causal relationships and has no obvious ways of performing logical inferences or integrating abstract knowledge such as what objects are for or how they are used. Neural nets cannot reason.

DETAILED DESCRIPTION OF SOME EMBODIMENTS

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities.

Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Further, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Figure 5:
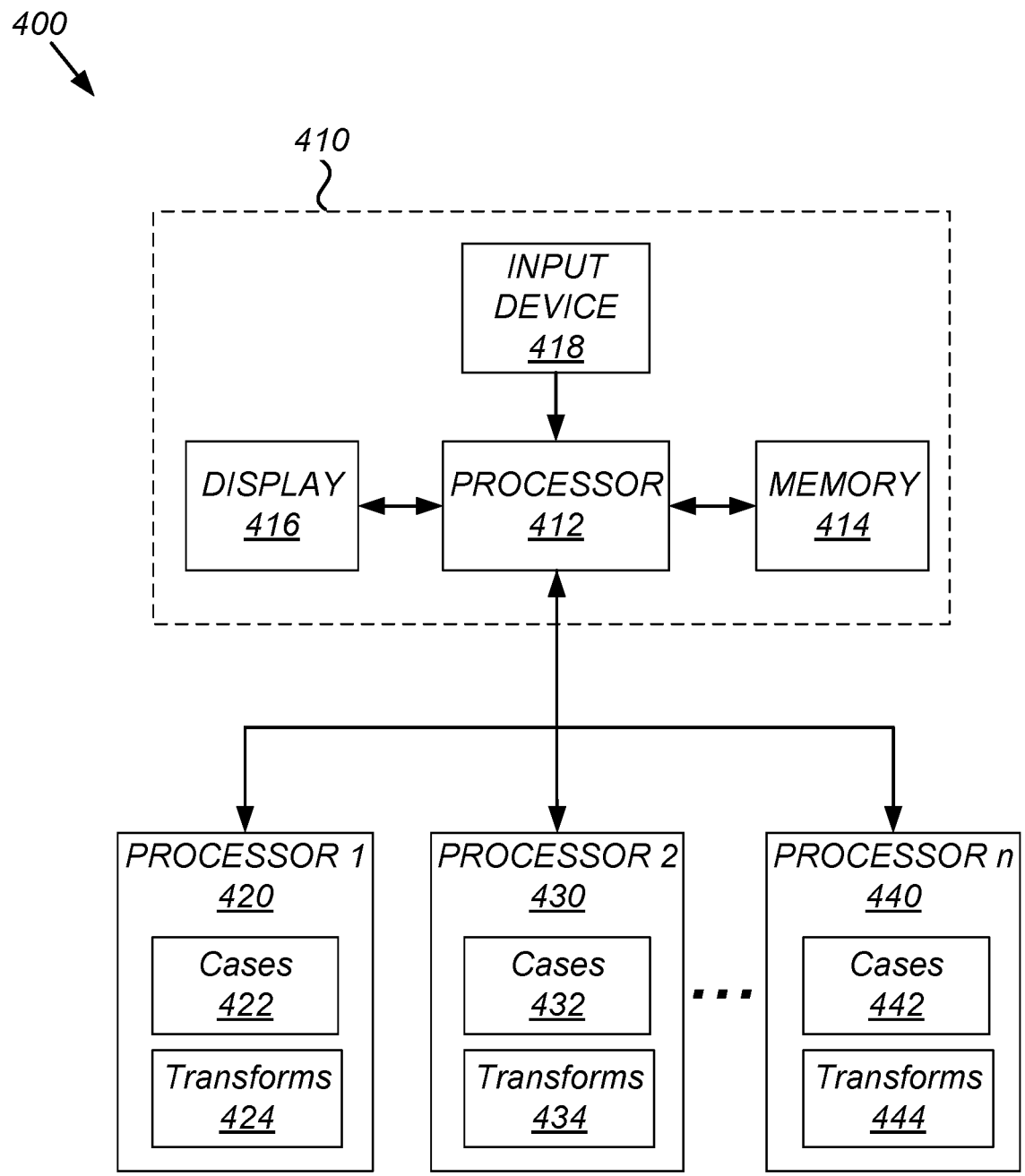
FIG. 5 shows a block diagram of an embodiment of a distributed processor system for implementing and performing methods in accordance with the disclosed embodiments.

Certain aspects of the disclosed embodiments include process steps and instructions described herein in the form of an algorithm. It should be noted that the process steps and instructions of the embodiments could be embodied in software, firmware or hardware, and when embodied in software, could be downloaded to reside on and be operated from different platforms used by a variety of operating systems. Different parts of the algorithm could be embodied in different elements of hardware or software, for example, as in a distributed processing system as shown in FIG. 5.

The disclosed embodiments relate to a far more capable form of deep learning—one capable of deductive, inductive, and abductive reasoning, or deeper learning. A system implementing the disclosed embodiments is able to run more efficiently and has exponentially more memory space, where memories are either neural (fundamental) or case-based (dependent). As a result, its deep learning subnets need be coherent, tractable to train in practice, and highly reusable—further minimizing the requisite training time. Deeper learning, unlike pure deep learning, is not mathematically trivial and can thus potentially achieve an unbounded density of memory, which is a requisite for an information-theoretic black hole. This means that neural memories can be integrated and true lifelike-intelligence becomes a boldly attainable goal—including commonsense reasoning. It suffers none of the limitations of its constituent naive deep learning subnets.

There are two fundamental problems with deep learning—(1) training is NP-hard and (2) deep learning does not integrate (randomize) fundamental memories, which means that it cannot recognize transformational analogies. Not only is deep learning incapable of modus ponens, but it is incapable of commonsense reasoning as well. The first problem is addressed by way of keeping the neural networks coherent and, as a consequence, relatively small in the number of fundamental memories they hold, as well as through the use of polynomial time symbolic learning techniques for faster, albeit suboptimal, training. The most fundamental of these techniques is the use of case-based learning (CBL) for the acquisition of symmetric constructs. Smaller nets are much more reusable and the combinatorics here imply an exponential increase in the number of dependent memories derived from the fundamental ones. The second problem is again addressed through the use of cases to integrate the situations defined by the coherent deep learning subnets. Each included neural network will produce a symbolic output, which reflects what its input pattern is mapped to. It is expected that this mapping will often be incorrect.

The case-based system maps a set of subnets having orthogonal outputs (i.e., mutually disjoint in training, or the features they are trained to respond to) to a more or less self-correcting analysis. The collective behavior of a mapped set of orthogonal subnets may differ from the output of the individually trained deep-learning subnets. In effect, this is a predictor-corrector method. In particular, the action space is multiplicative; whereas, the fundamental (neural) memory space is additive. Moreover, structural and even functional analogy become possible; albeit, the involved coherent subnets must be carefully selected to achieve this—e.g., through the impact of a secondary case-based system specific to this task.

For example, if a first deep learning neural network outputs the color yellow, a second deep learning neural network outputs the color blue, and a third deep learning neural network outputs the color red, the case-based system may be trained to produce an output of brown when receiving such inputs from the set of deep learning neural networks. Such training results in a case being created within the case-based system as is set forth below.

The systems and methods described herein represent an improvement in the functioning of computing systems that include one or more processors. The systems and methods make such systems more efficient and effective in that the fundamental memories of the individual deep learning neural networks are kept below the fundamental memory threshold so that there is no degradation of the operation of such networks. For example, if such neural networks were to significantly increase in size past the fundamental memory threshold, the prior memories within such neural networks will degrade due to the weights being re-allocated, causing a less-certain response for future received inputs referencing previously stored memories. This is because the set(s) of hidden weights can only be adjusted to represent so many disjoint objects before attempts at further adjustment imply the loss of embedded memories. This loss is fuzzy. It is similar to the gradual degradation of a holographic image as the photographic plates are eroded. This can be compensated for by adding more weights, but there is an insurmountable problem is so doing. That is, any neural network having at least one hidden layer is NP-hard to train. By adding more neural weights, you make the network exponentially more time-consuming to train.

In the disclosed systems and methods the deep learning neural networks do not need to be retrained based upon giving an incorrect response. This is significant, as neural networks are generally trained using a back-propagation method, which again is exponentially complex in the required training time. Rather than training an ever-larger neural network, the case-based system is trained by a user to associate whatever responses it receives from a set of more than one of the deep learning neural networks with a correct output. In some embodiments, the case-based system may provide such output with an associated confidence factor. Further, while neural networks are primarily feature-based, the case-based system can be trained to recognize features, symbols, or any other identifying characteristic of an input.

The use of case-based reasoning, as a framework for deeper learning, means that a strong artificial intelligence (AI) is provided for—including a heuristic deductive predicate calculus and inferential reasoning by way of grammatical inference and abduction. Deep learning is an appropriate AI paradigm, but it needs the aforementioned symbolic augmentation to complete the capability for intelligent heuristically-delimited reasoning, or deeper learning.

Deeper learning derives from randomization theory. Randomization is an effective process for reducing information to an approximate minimal form. For example, a sequence of numbers is said to be random because the length of a numerical sequence approximates that of its most compact recursively enumerable (known) generator. Furthermore, according to Chaitin, "A series of numbers is said to be random, if the smallest algorithm capable of specifying it to a digital computer has about the same number of bits of information as the series itself. A random series of digits is one whose complexity is approximately equal to its size in bits. Since complexity has been defined as a measure of randomness, no number can be effectively proved to be random unless the complexity of the number is less than that of the system itself."

Despite the power of deep learning methods, they still lack much of the functionality for realizing strong AI. Deep learning is lacking in ways for finding causal relationships and has no obvious ways of performing logical inferences or integrating abstract knowledge such as what objects are for or how they are used. Simply put, neural nets cannot reason! Deeper learning attempts to correct these and other faults by incorporating symbolic reasoning into deep learning through heuristic integration. Heuristic integration refers to the extraction and fusion of symbolic evidence from disjoint neural outputs. Deeper learning can generate sentence-long descriptions of photos, with no identifying tags, in seconds, or retrieve all photos showing more or less abstract objects (e.g., F-35s to "armament"). However, it cannot, by itself, mine data to produce symbolic equations, programs, or the like (e.g., Kepler's 2d Law of Planetary Motion). The best that it can do here is provide instruction as to what steps need to be taken to discover the same.

Deep learning uses one or more hidden layers to map distinct input vectors to their trained associations. Randomization theory implies the extraction of common properties (features) and filtering these sets for saliency. Deep learning alone does not account for this. Furthermore, it would be inordinately laborious and error-prone to attempt to manually extract these features (e.g., the old way of doing computer vision). Rather, even though neural nets may incorrectly map input vectors to output vectors, their output correlates with their input patterns. If the set of neural outputs (and hence the neural weight vectors) are trained to represent an orthogonal set of fundamental memories, the semantic space for that set will be multiplicatively expanded for objects not in the fundamental memory set, but characterized by it. Hence, these neural networks are effectively extracting and recognizing abstract features and fusing them to recognize composed objects.

Composed objects may be random—in which case a fundamental neural memory is recognized, or they may be symmetric—in which case it is dependent on two or more fundamental neural memories for its semantics. This is analogous to linear independent and dependent vectors in matrix theory, respectively. That is, the collection of neural networks comprises the basis vectors and the case-based reasoning system comprises all transformations thereof. In this manner, the recognition space for the collection of deep learners can be much greater than the total number of orthogonal objects recognized by the included orthogonal deep learners (i.e., multiplicative vs. additive). The relevant deep learner receives additional training just in case the object to be recognized is in its set of fundamental memories. A new case is then acquired, as necessary.

Hidden layer neural networks are tractable to train, despite being NP-hard, on account of their coherency and relaxation of the need for optimality. This relaxation occurs because recognition is through an effective fusion process, rather than being determined by one or relatively few neural networks. There are at least four properties associated with good features (neural network extractors):

1. Saliency—features which correlate with outcomes and/or other features in the determination of outcomes
2. Orthogonality—independence so as not to skew the fusion and recognition process
3. Coherency—or domain-specificity implies reusability, fast training, and orthogonality
4. Utility—it is possible to satisfy the previous three properties, but fail in their predictive utility. This can occur when combinations of features are not captured (e.g., formulas). The capture of higher-order non-linear features implies the use of larger neural networks; and, this limits the potential of the methodology. Fortunately, one does not need to learn equations of motion to be an outstanding baseball player for example—implying that this is more of a theoretical than practical limitation. Besides, the science of extracting models from data is a distinct field, which is realizable through schema theory. The allowance for heuristic reasoning implies that even Godel's Incompleteness Theorem is not a limitation here.

Randomization cannot be bounded. This means that, in the limit, it must be the most efficient creator of new knowledge imaginable. The failure of neural networks to be capable of modus ponens limits their capability to not only deduce knowledge, but quite obviously to induce it as well. It follows that no matter how well deep learning performs on pattern recognition problems, it is mathematically trivial in solving general problems because it is not scalable. The solution of such problems is said to require a strong AI, which means that it requires access to domain-specific knowledge. It follows that a capability for symbolic reasoning is required to realize the unbounded density of knowledge. The case-based framework provides an initial requisite substrate.

The approach consists of two parts. First, we define what deep learning is and why it is best multiply deployed within a symbolic (case-based) framework. However, there are limitations to such a system of systems. It will not perform as well as a single well-trained neural network. That is not the intent. Rather, again such a single network is inherently intractable to train (i.e., it cannot be scaled). The intent is to approximate such a monolithic system using tractable components.

Next, a case-based framework is presented as a tractable way to extend the power of deep learning, which is NP-hard and thus again of limited scalability. In ensemble neural learning, several neural networks are trained on the same data using different random initializations. These networks then participate in a vote to determine the best classification, which is usually better than any individual network. Case-based frameworks differ from such ensemble learning in that the latter finds the best of many classifications; whereas, the former combines many to converge on the best classification, which may not even be among the votes.

Furthermore, case-based frameworks offer a solution to the recently discovered problem that deep learning can produce high confidence predictions for unrecognizable images. Given a trained network, it's possible to generate images which look to a human like white noise, but which the network classifies as being in a known category with a very high degree of confidence. Case-based frameworks offer a solution to this problem as well. Moreover, extending deep learning to incorporate a symbolic representation allows for all manner of effective reasoning to be incorporated into a system of systems. Thus, the proper nomenclature for such a deep learning system is deeper learning.

Many objects of interest (e.g., handwritten digits, images, sounds, etc.) do not lend themselves to symbolic representations. They are just too complex and/or ambiguous for this. Neural networks are ideally suited for feature extraction. In particular, deep learning can autonomously learn to extract salient features from a dataset—making it an ideal tool to combine with a symbolic reasoner. Using deep learning, each neuron computes the sigmoidal function, $$y = \frac{1}{1+e^{-z}}, \text{ where } z = \sum_{i=1}^{n} w_i x_i.$$

These outputs are transmitted to other neurons as input. Neuron outputs need not be connected to every input of neurons in the next layer. Layers may also vary in the number of neurons. The sigmoidal function may be replaced with rectified linear learning, $\sigma(x)=(1+\tan h(x/2))/2$, for slightly improved performance in some situations. A theory of activation functions has yet to be developed.

The neural network iteratively modifies the weights to minimize the errors made in mapping a large number of training examples to their proper class. The use of nonlinear neurons implies that such methodologies as the delta rule can get the training methodology stuck on a local minimum that is not a global minimum. Thus, a method called stochastic gradient descent is used, which uses randomization and noise (i.e., simulated annealing) to find the global minimum on a complex error surface. Knowing how fast the error changes, enables the Backpropagation algorithm to find the path of steepest descent.

Deep learning needs to be tweaked to prevent overfitting the data. This leads to poor predictions. Overfitting occurs when one has too many parameters in the model, which implies a need to limit the connectivity of the neurons. Moreover, the deep learning system network can be convolutional, which is to state that it can handle translation invariance of images (e.g., images not centered or shifted in the field of view). Convolutional neural networks have an additional layer of output neurons.

Deep learning requires the following modifications be made to work in conjunction with case-based frameworks. First, whenever an object is known and fundamental (i.e., through associative memory, or by way of a table lookup), the neural network owning that object is trained, as necessary, until it properly recognizes the input pattern. This is always possible and may result in the loss of one or more fundamental memories. Such training, or confirmation, occurs before case acquisition.

Whenever a presented object is not known, the neural nets in the inclusion set will respond with what they see. These outputs are fused by a case and associated with the definition of the true object. The fact that deep learning does not integrate memories implies that the relation, or lack thereof, between fundamental memories in a neural network is without consequence. For example, when net1 sees "a", net 2 sees "b", and net3 sees "c", the actual object can be "d", or any of the preceding objects. Here, each net is performing an analogous feature extraction followed by a case-based fusion. That is how CBL is used to overcome the fundamental memory limitation and the associated NP-hard training times. It follows from information theory that the number of neural networks should be the square of the number of fundamental memories per network. As the NP-hard training limit is reached for the hardware and application, further scaling is possible through the use of segmented domains (see below).

The case-based framework is run and the proper existing case is fired and moved to the logical head of the case base, or a new case is acquired, at the logical head of the case base, otherwise. The feature outputs of each deep learning net are fused to produce an aggregate image. The inference engine is inherently fuzzy. This means that the case selected for firing is the one having the greatest number of matched situational predicates and otherwise the logically highest in the list. The use of orthogonal subnets (see below) implies that a uniform weighting of the situational subnets will produce the most accurate results. Cases are only acquired in the event of an incorrect case action (i.e., recognition). Convergence is assured because neural recognition, whether correct or not, is always mapped by the same learned input patterns. Updated and unused cases will fall to the logical tail, where they will be subject to tail deletion. In this manner, the system of systems evolves ever-more accurate neural outputs as well as ever-more accurate feature descriptions of all recognized objects.

Figure 1:
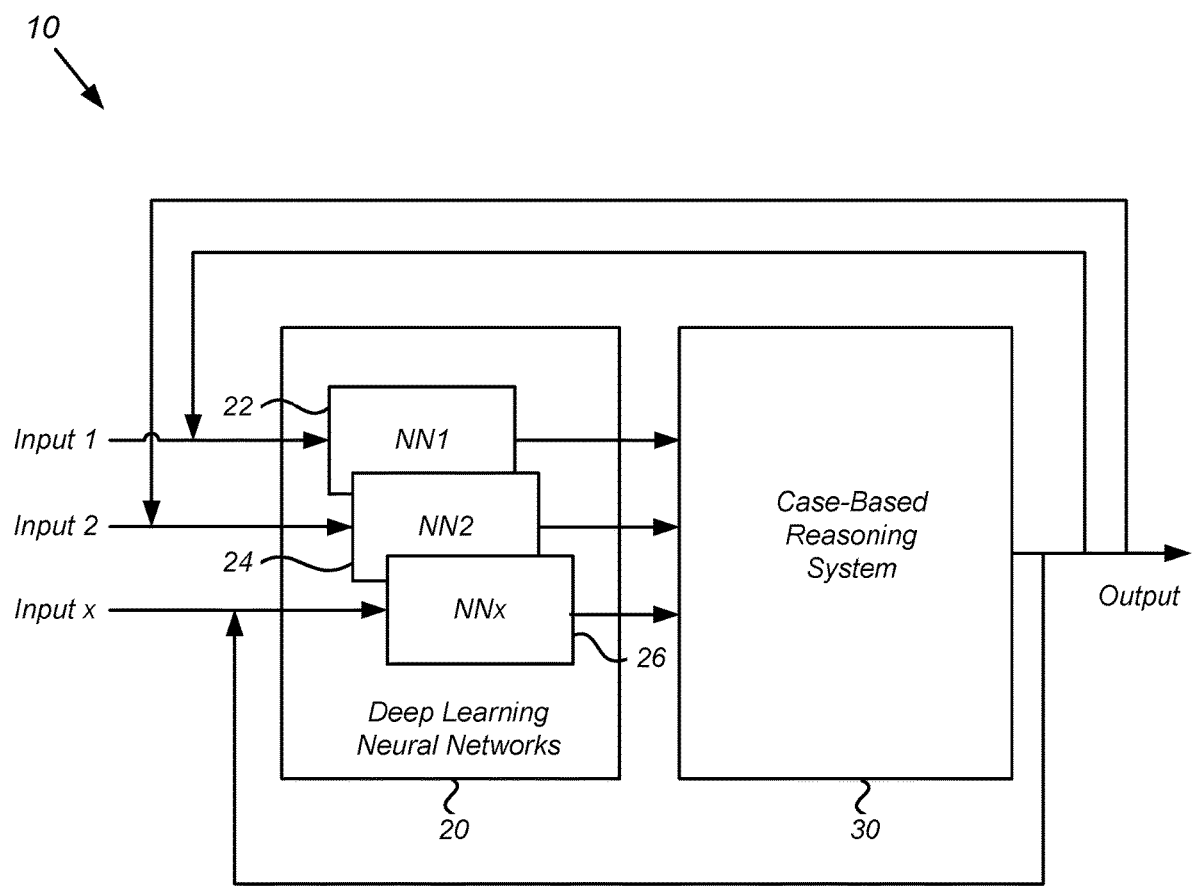
FIG. 1 shows a diagram illustrating a system in accordance with the disclosed embodiments.
Figure 2:
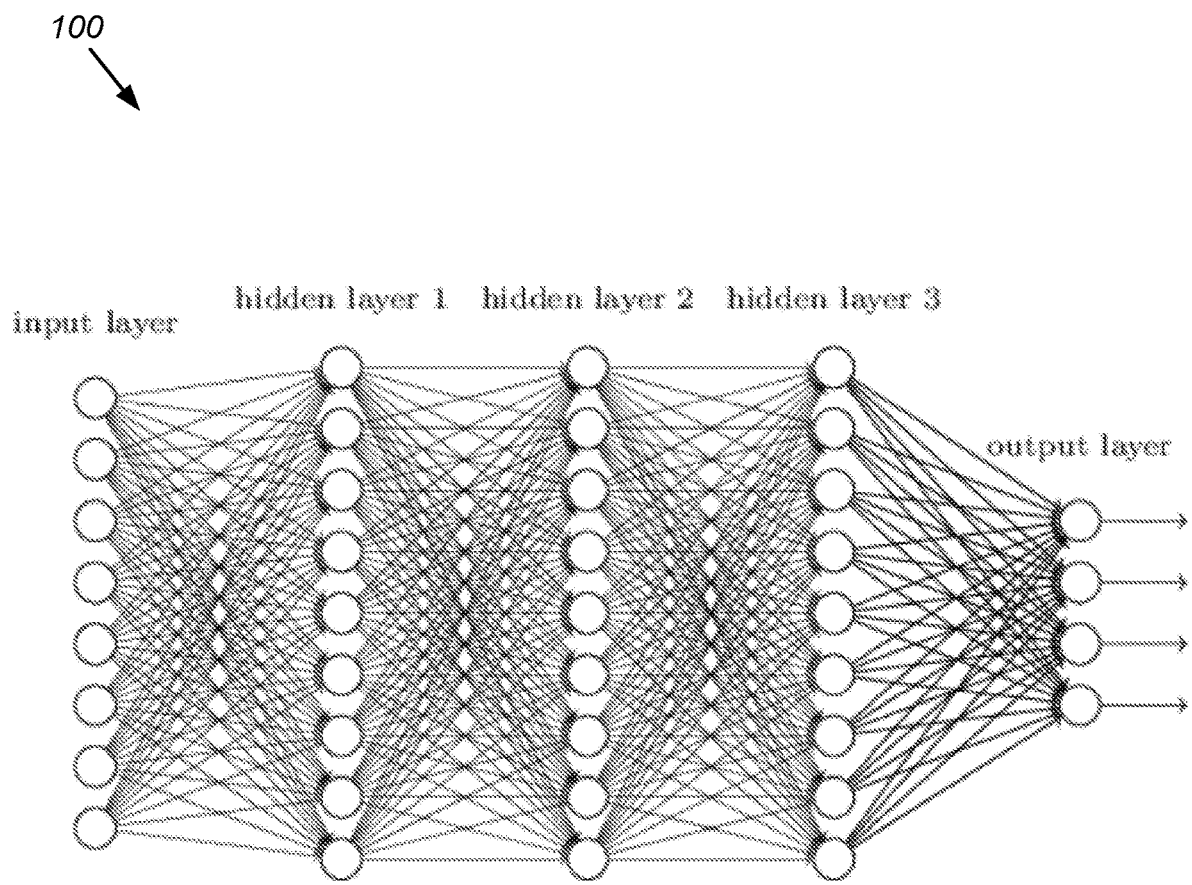
FIG. 2 shows a diagram illustrating an embodiment of a deep learning neural network that may be used in accordance with the disclosed embodiments.

FIG. 1 shows a diagram 10 illustrating a system in accordance with the disclosed embodiments. As an example, the components shown in FIG. 1 may be implemented within one or more processors, such as shown in FIG. 5. A set of deep learning neural networks 20 is implemented within a processor. As shown, set 20 includes a first deep learning neural network 22, NN1, a second deep learning neural network 24, NN2, and an $x^{th}$ deep learning neural network 26, NNx. Each neural network receives a separate input—NN1 receives input 1, NN2 receives input 2, and NNx receives input x. FIG. 2 shows a diagram 100 of an architecture of a deep learning neural network that may be used in accordance with the embodiments of the systems and methods disclosed herein, such as for networks 22, 24 and 26.

No pair of deep learning neural networks within the set of deep learning neural networks 20 produces a semantically equivalent output by design. A fundamental memory of each deep learning neural network within the set of deep learning neural networks 20 is below a fundamental memory threshold for the respective deep learning neural network. Each of the deep learning neural networks within the set of deep learning neural networks 20 has more than one hidden layer, such as shown in FIG. 2. Each of the deep learning neural networks within the set of deep learning neural networks 20 are specific to the same domain.

Each neural network produces a separate output that is received as input to a case-based reasoning (CBR) system 30, which is also implemented within a processor such as shown in FIG. 5. CBR system 30 is configured to receive, as input, the output of the one or more deep learning neural networks 22, 24, or 26. CBR system 30 is further configured to generate an output of CBR system 30 responsive to the input received by the CBR system if the input received by the CBR system is known by the CBR system. The processor is configured to determine that the output of the CBR system is a correct output, for example by receiving input from a user of the system, and is further configured to train one of the deep learning neural networks 20 on the correct output if the correct output is specific to the particular one of the deep learning neural networks 20. In some embodiments, this training may occur provided the result does not increase the fundamental memory of the neural network past its threshold memory.

The following discussion relates to the case-based framework. Define an orthogonal dynamic set of deep learning neural networks. The term, orthogonal means that no pair of neural networks, in the set, may produce a semantically equivalent output by design. The minimization of redundancy is necessary to minimize the required computational resources as well as again to prevent skewing of the pattern-matching inference engine in selecting the most-appropriate case to fire. Each neural network will produce an output, in its defined set of output instances, regardless of the certainty of that output. The output may include text, images, symbols, or any object feature characteristic.

Figure 3:
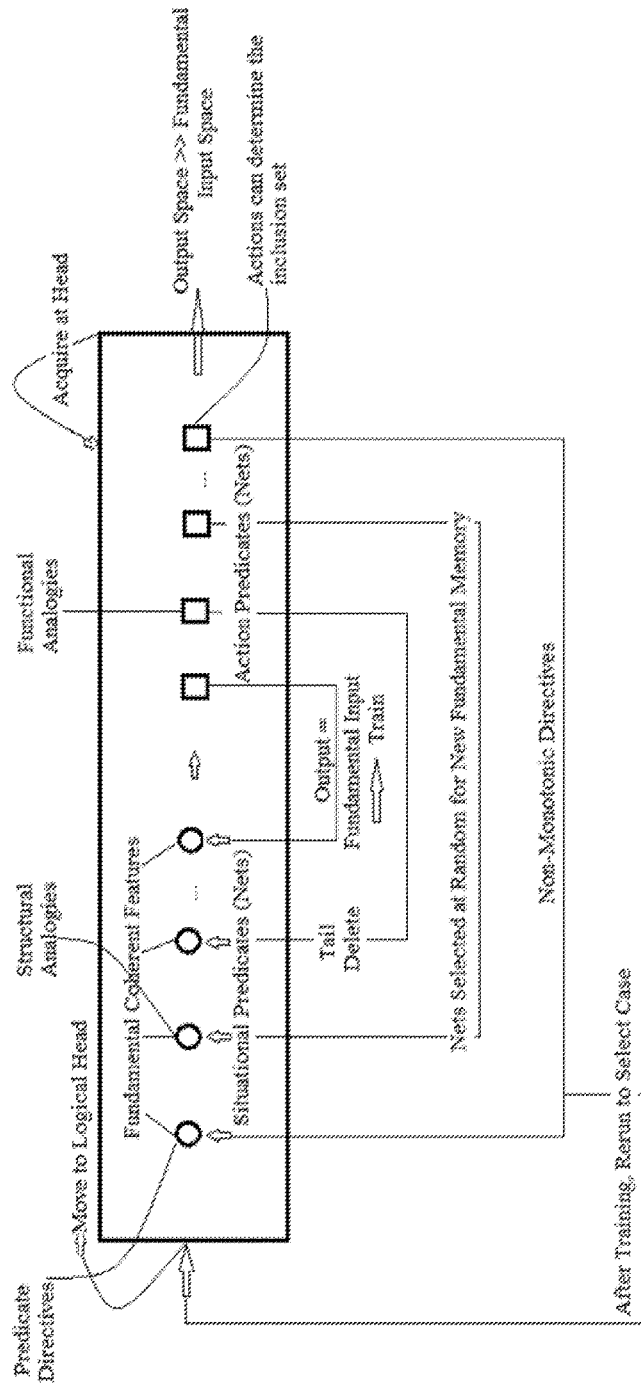
FIG. 3 shows a diagram illustrating an architecture of the deeper learning methods in accordance with the disclosed embodiments.

Neural outputs define fundamental recognized objects. The greater the number of orthogonal neural networks, the better the accuracy of the system of systems. It is required that these networks be salient to the domain to prevent dilution. Furthermore, the fusion of multiple neural network outputs, in determining a recognized object, implies that the accuracy of any individual net may be relaxed slightly. This, in turn, allows for incompletely trained hidden-layer deep networks to be heuristically and iteratively useful components in the system of systems. FIG. 3 shows a diagram 200 illustrating the essential architecture of a deeper learning neural network as is contemplated by the embodiments disclosed herein.

Define a case-based reasoning (CBR) system, which accepts, as situational input, the orthogonal outputs of two or more deep learning neural networks, such as the deep learning neural networks 20 shown in FIG. 1. Additional predicate directives may also be included in the set of inputs. For example, the same image may be combined with a directive to see if it contains a friend or foe, or a near or far target say, based on a different directive. Directives (i.e., symbolic instructions) are fused just as are, and with, multiple subnets. Outputs of the CBR system include the fused (corrected) outputs of the orthogonal neural networks and directives to train one or more neural networks (i.e., a distinct type of directive) on specified orthogonal (fundamental) outputs. Cases may be tail-deleted, to save space, using a most-recently-used, move-to-the-logical-head paradigm.

A user in the loop can provide feedback to train the case-based system on correct outputs given the input into the set of deep learning neural networks and the outputs provided by the set of deep learning neural networks responsive to the input. Whenever the correct output includes an output specific to necessarily one neural network, that network is trained on the correct output until it is properly acquired. This may involve more than one neural network. For example, if the correct output were say, "supersonic fighter plane," then one neural network may be trained on the output, "fighter plane" and another on the disjoint output, "supersonic". Outputs are acquired by the set of appropriate neural networks subject to the following constraints:

a. The fundamental saliency and orthogonality properties are preserved;

b. The number of fundamental memories is not exceeded—unless it is accepted that previous training will be lost;

c. The coherence property of the neural network is maintained (i.e., trained memories must be domain-specific—not domain-general); and d. Semantic outputs may be known by no more than one deep learning network by design; although, this may occur by chance. Unknown outputs, deemed to be of fundamental value, are acquired by a randomly selected deep learning neural network from the inclusion set. Random selection is allowed because again, deep learning does not integrate memories. Cases are tail-deleted to free space, as necessary. Thus, the utility of the system is non-monotonically increasing.

If any neural network is trained, the case-based framework must be rerun to select a case to be fired. If an erroneous case or no case is produced, then one is acquired, where the situation is defined below and the associated action is the correct output. Actions may include a non-monotonic component, which is defined to be a secondary action to enable the firing of another case on the next iteration (e.g., inserting the predicate, immediate response required =true). Case acquisitions may occur in real-time; whereas, the training of the hidden-layer neural networks will necessarily be slower, but not that much slower because the case-based system encourages the creation of small reusable suboptimal neural networks vice monolithic optimal, intractable to train, large ones. Even though the training of layered neural networks is NP-hard, small nets can be tractably trained. The fusion of multiple suboptimal nets is representative of a symbolic heuristic method.

The actions produced by the output of the CBR system are not limited to those produced by the union of the set of neural networks. Rather, if all of the variables leading to a desired action are covered by the included set of neural networks as augmented by the included situational predicate directives, then the non-deterministic action space may be greater than the sum of neural orthogonal outputs. Specifically, the number of orthogonal outputs is additive in the number of network outputs; whereas, the number of case outputs is multiplicative in the number of network output—including directives—as an upper bound. That is, the memory space of orthogonal hidden-layer deep learning neural networks is $O(m*n)$ in the number of network outputs and $O(m**n)$ in the number of case outputs, where m is the mean number of fundamental memories per subnet and n is the number of orthogonal hidden-layer subnets (i.e., including directives) in the single system of systems. New actions imply the acquisition of a new case, since the situational triggers may be fuzzy.

Each case-based framework requires a decision on the appropriate domain-specific neural networks (orthogonal inputs/outputs) to be included (i.e., the inclusion set). If too few or the wrong ones are included, then the produced actions will be ill-determined. Conversely, if too many neural networks are included, not only will computational resources be wasted, but the non-salient excess will contribute again to ill-determining the produced actions. The inclusion set defines a cohesive segment. Also, the training of any neural network having at least one hidden layer is again NP-hard. Again, it follows that having many domain-specific neural networks is preferable to having few monolithic incoherent ones. That being the case, it is better to err on the side of over-including domain-specific neural networks.

The inclusion set could be acquired by yet another case-based framework. The iterative definition of this concept is a consequence of randomization theory. It often occurs that a situation is not exactly matched; although, a best-matching situation can readily be found. Other case-based systems will sometimes weigh the matching variables so that a dominant solution emerges. However, this practice only defers the inevitable resolution among partially matched situations and the best weighting scheme generally requires too much data for practical neural analysis. The solution, a consequence of training orthogonal subnets, is to select that case having the highest percentage of its situational (neural) variables matched and otherwise favor the most-recently-used case. Should the produced action be deemed to be incorrect by a user providing feedback, then a correct action(s) is acquired and associated with the situation, which would be exactly matched in a new case. This case is acquired at the logical head.

Figure 4:
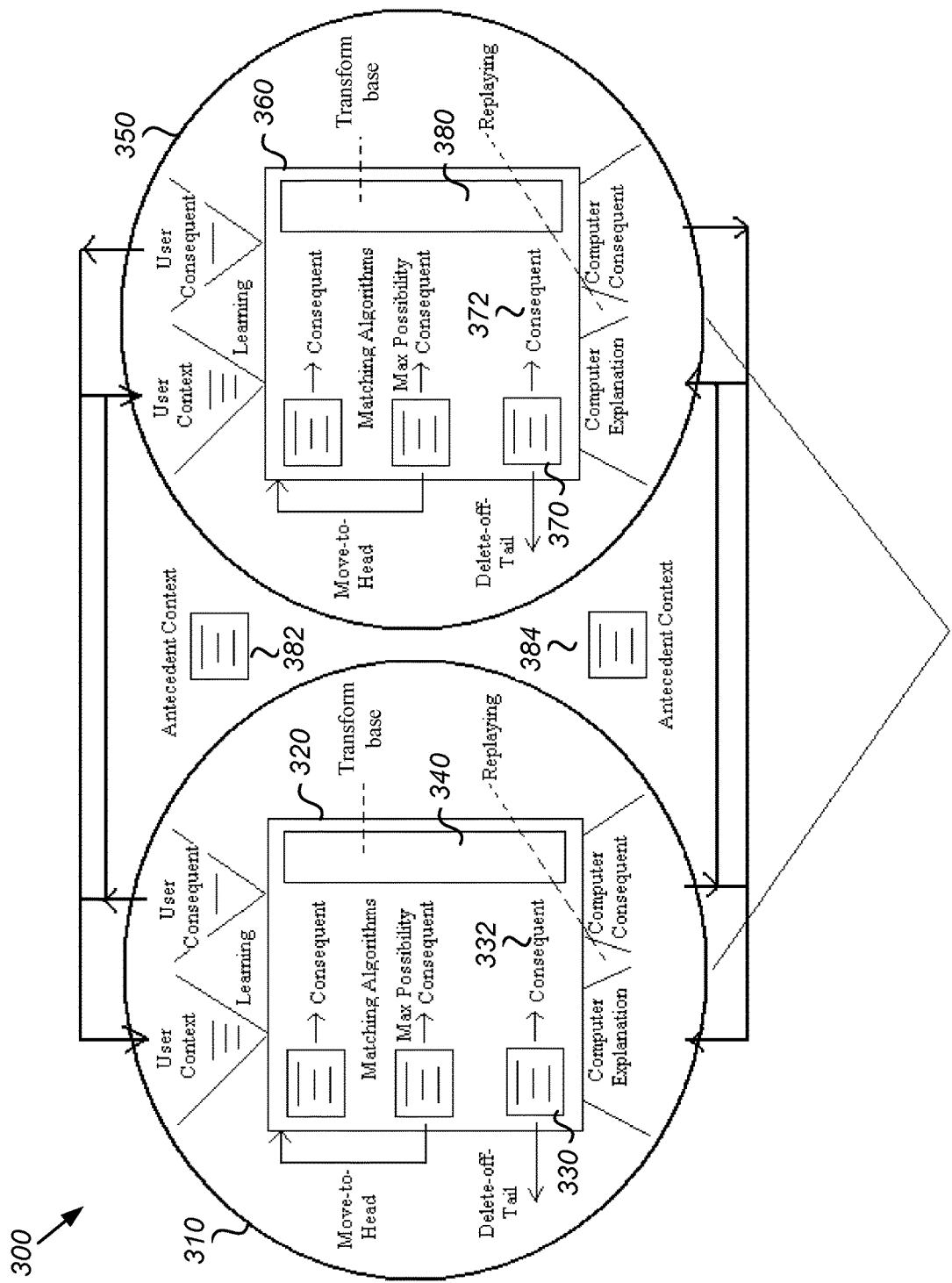
FIG. 4 shows a diagram illustrating a system architecture that may be used to perform the methods in accordance with the disclosed embodiments.

FIG. 4 shows a diagram 300 illustrating a system architecture that may be used to perform the methods accordance with the disclosed embodiments. Diagram 300 includes systems 310 and 350. System 310 includes a case base system 320 including a plurality of cases having one or more antecedents 330 and one or more associated consequents 332. Antecedents 330 may be comprised of one or more independent variables that include Boolean and non-Boolean variables. System 310 may further include a transform base 340. The cases and transform base 340 may be stored in memory within, for example, computing system 410 shown in FIG. 5. Similarly, system 350 may include a case base system 360 including a plurality of cases having one or more antecedents 370 and one or more associated consequents 372. Consequents 372 may comprise a domain specific dependency variable. System 360 may further include a transform base 380. The cases and transform base 380 may be stored in memory within, for example, computing system 410 shown in FIG. 5.

In operation, user-supplied contexts are input into case base systems 320 and/or 360. The user-supplied contexts may comprise one or more contextual antecedents, such as contextual antecedents 382 and 384, which are compared to the one or more case antecedents, such as 330 or 370, which are stored in the case base.

The cases stored in the case base include case antecedents and case consequents, both of which are previously supplied by a user, either during training of the system or during real-time system operation. A case involving the best match of the case antecedents with the contextual antecedents is then determined, with the contextual antecedents being supplied to the CBR system by the set of deep learning neural networks. The consequent of the selected case may then be displayed to a user, such as via display 416 shown in FIG. 5, where the user may identify the response as being correct or incorrect. The selected case is moved to the head of the case base, as indicated in FIG. 3. In the event memory constraints occur, least-frequently-used cases are deleted from the tail of the case base, as indicated (or moved to a backup secondary memory device such as an optical jukebox). In some embodiments, in a training mode, the system may display, in addition to the case consequent(s) an explanation of the case antecedent(s) that were matched with the contextual antecedent(s) supplied by the user.

Some general rules that may be implemented into the system and method disclosed herein may include: 1) cases may be learned if the user agrees with the consequent or not—so long as they do not duplicate an existing case, in which case the existing case is simply moved to the head of the queue; 2) cases are moved to the head of the queue so that the most-recently referenced case will break any ties among cases having the same computed possibility and so that the least-recently referenced cases will fall to the tail where they may be expunged with minimal functional loss; 3) consequents that ask a question however are not moved to the head because they are not as valuable as regular cases when (if) case memory fills up; and 4) consequents may be specified as "unknown" for consideration for subsequent specification (or not), when they may become known.

One problem, to be addressed, pertains to how to recognize structurally similar objects (e.g., one chair in place of another), which serve as suitable situational substitutes for triggering the desired action(s). The situation to be associated with a specified correct action(s) is represented by a fusion of analogous neural outputs. Analogies are most likely to fire in the future—showing that the case-based framework enables deep learning to perform structural analogies (e.g., recognizing both the image "3" and its previously untrained negative).

Functional analogies (e.g., a large flat rock in place of a chair) are more abstract than structural ones. They derive from situational properties—not necessarily from the literal situations themselves. They are pre-determined by the inclusion set, which derives from a domain-specific high-level view of the problems to be solved. The allowance for a dynamic inclusion set, which may be determined by a second domain-specific case-based system, enables functional analogies to be learned.

Again, neural networks are incapable of performing modus ponens. If actions are expressed in the second-order predicate calculus (i.e., using factual assertions, universal, and existential qualifiers), then a Prologue-based (i.e., predicate calculus) reasoning system can be built on top of the deep learning system for performing logical inferences. The back-cut mechanism can be pruned by non-monotonic cases—allowing for scalable deduction.

If situations and actions are expressed in a context-free grammar, then inferential (inductive reasoning) becomes possible and the deep learning system can infer causal relationships. Combining the above, it follows that deep learning can be integrated into a case-based grammatical and predicate calculus framework to realize a strong AI, which is also capable of abductive reasoning. Furthermore, object definitions and uses may be held by a relational database.

The disclosed embodiments may be performed on a system such as system 400 shown in FIG. 5. As such, system 400 may include a computer 410 having processors 420, 430, and 440 connected thereto. Computer 410 may include a processor 412, memory 414, display 416, and input device 418, such as a keyboard or mouse. System 400 may be used to provide an increase in computing capacity by allowing processor 412 to coordinate processors 420, 430, and 440 such that maximum processing capabilities are achieved. Processors 420, 430, and 440 may each represent different domain-specific segments of a case-based system. As an example, if the case-based system involved prediction of sports injuries, one domain segment may involve baseball, one domain segment may involve basketball, one domain segment may involve football, and so forth, with a separate processor being used for each domain-specific segment. In such embodiments, processor 420 contains a case base 422 and a transform base 424, processor 430 contains a case base 432 and a transform base 434, and processor 440 contains a case base 442 and a transform base 444. However, in some embodiments, one processor may be used to store and process all domain-specific segments.

Figure 6:
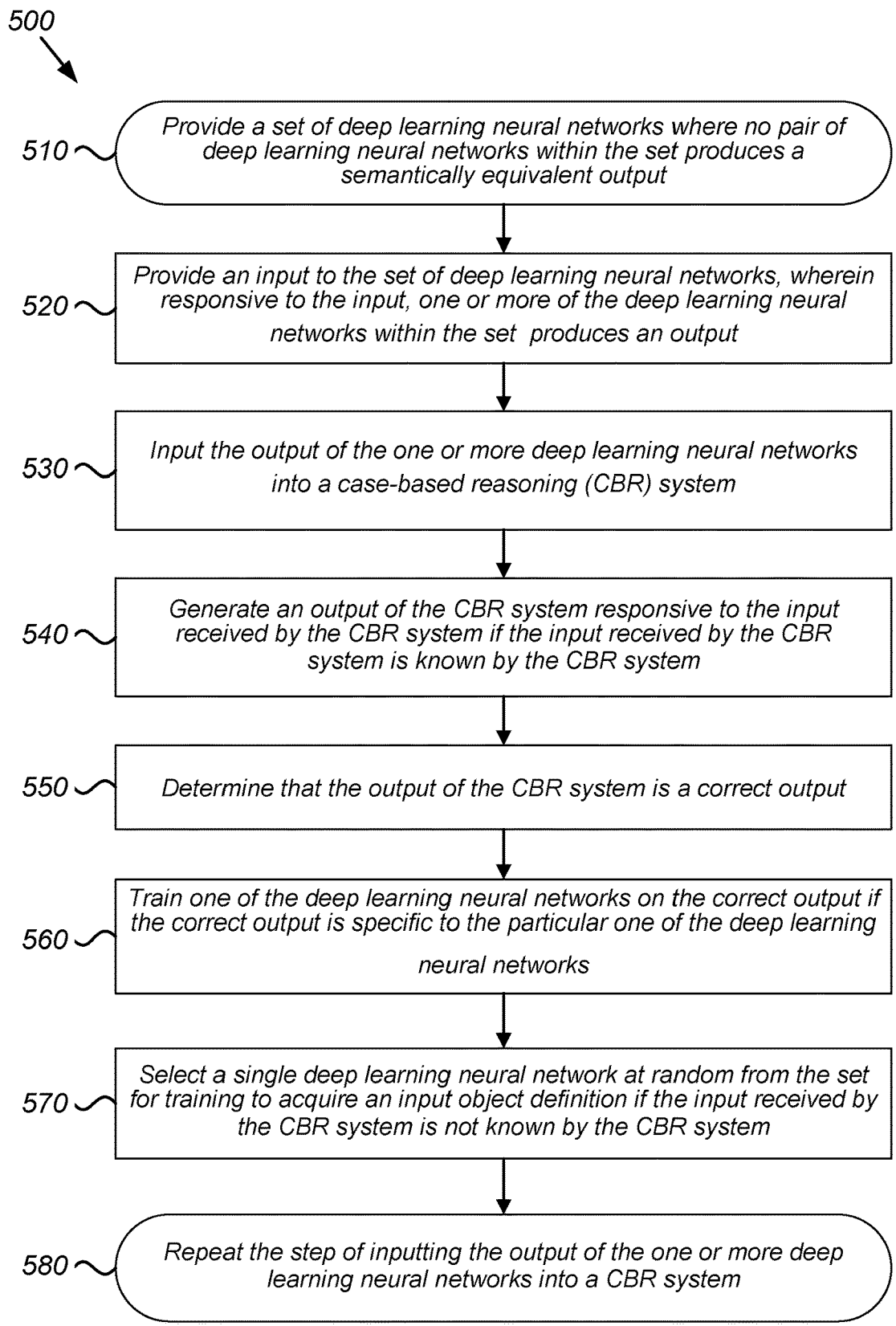
FIG. 6 shows a flowchart of an embodiment of a method in accordance with the disclosed embodiments.

FIG. 6 shows flowchart of an embodiment of a method 500 in accordance with the disclosed embodiments. Some or all of the steps of method 500 may be performed by a system such as system 400 shown in FIG. 6. Further, while FIG. 6 shows one embodiment of method 500 including steps 510-580, other embodiments of method 500 may contain fewer steps or more steps. Further, while in some embodiments the steps of method 500 may be performed as shown in FIG. 6, in other embodiments the steps may be performed in a different order, or certain steps may occur simultaneously with one or more other steps.

Method 500 may begin at step 510, which involves providing a set of deep learning neural networks 20, where no pair of deep learning neural networks within the set of deep learning neural networks is designed to produce a semantically equivalent output. Step 520 involves providing an input (e.g. input 1, input 2, input x) to the set of deep learning neural networks 20, wherein responsive to the input, one or more of the deep learning neural networks 22, 24, and 26 within the set of deep learning neural networks 20 produces an output. Step 530 involves inputting the output of the one or more deep learning neural networks into a case-based reasoning (CBR) system 30.

Method 500 may then proceed to step 540, which involves generating an output of the CBR system 30 responsive to the input received by the CBR system if the input received by the CBR system 30 is known by the CBR system (e.g. there is a case that fires responsive to the input). Step 550 involves determining that the output of the CBR system 30 is a correct output, such as via receiving feedback from a user of the system. Step 560 involves training one of the deep learning neural networks on the correct output if the correct output is specific to the particular one of the deep learning neural networks.

In some embodiments, method 500 may then proceed to step 570, which involves selecting a single deep learning neural network 22, 24, or 26 at random from the set of deep learning neural networks 20 for training to acquire an input object definition if the input received by CBR system 30 is not known by CBR system 30. Step 580 involves, subsequent to the training of one of the deep learning neural networks, repeating the step of inputting the output of the one or more deep learning neural networks 20 into CBR system 30.

The language used in the specification has been principally selected for readability and instructional purposes, and may not have been selected to delineate or circumscribe the inventive subject matter. Accordingly, the disclosure of the inventive subject matter is intended to be illustrative, but not limiting, of the scope of the invention, which is set forth in the following claims.

Further, many modifications and variations of the embodiments disclosed herein are possible in light of the above description. Within the scope of the appended claims, the disclosed embodiments may be practiced otherwise than as specifically described. Further, the scope of the claims is not limited to the implementations and embodiments disclosed herein, but extends to other implementations and embodiments as may be contemplated by those having ordinary skill in the art.

I claim:

1. A method comprising the steps of:
providing a set of deep learning neural networks implemented within one or more processors, wherein no pair of deep learning neural networks within the set of deep learning neural networks produces a semantically equivalent output by design, wherein a fundamental memory of each deep learning neural network within the set of deep learning neural networks is below a fundamental memory threshold for the respective deep learning neural network;

providing an input to the set of deep learning neural networks, wherein responsive to the input, one or more of the deep learning neural networks within the set of deep learning neural networks produces an output;

inputting the output of the one or more deep learning neural networks into a case-based reasoning (CBR) system;

generating an output of the CBR system responsive to the input received by the CBR system if the input received by the CBR system is known by the CBR system;

determining that the output of the CBR system is a correct output; and training one of the deep learning neural networks on the correct output if the correct output is specific to the particular one of the deep learning neural networks.

2. The method of claim 1 further comprising the step of selecting a single deep learning neural network at random from the set of deep learning neural networks for training to acquire an input object definition if the input received by the CBR system is not known by the CBR system.

3. The method of claim 1, wherein the output of the CBR system includes fused outputs of the set of deep learning neural networks and directives to train one or more of the set of deep learning neural networks on specified outputs.

4. The method of claim 1 further comprising the step of subsequent to the training of one of the deep learning neural networks, repeating the step of inputting the output of the one or more deep learning neural networks into a CBR system.

5. The method of claim 1, wherein the output of the CBR system generated responsive to the input received by the CBR system is a mapped set of orthogonal subnets.

6. The method of claim 1, wherein the input received by the CBR system is known by the CBR system if the input received by the CBR matches each situational predicate of at least one case stored in the CBR system.

7. The method of claim 1, wherein the step of determining that the output of the CBR system is a correct output is performed by receiving feedback from a user of the CBR system.

8. The method of claim 1, wherein each of the deep learning neural networks within the set of deep learning neural networks has more than one hidden layer.

9. The method of claim 1, wherein each of the deep learning neural networks within the set of deep learning neural networks are specific to the same domain.

10. A method comprising the steps of:
providing a set of deep learning neural networks implemented within one or more processors, wherein no pair of deep learning neural networks within the set of deep learning neural networks produces a semantically equivalent output by design, wherein a fundamental memory of each deep learning neural network within the set of deep learning neural networks is below a fundamental memory threshold for the respective deep learning neural network, wherein each of the deep learning neural networks within the set of deep learning neural networks has more than one hidden layer, wherein each of the deep learning neural networks within the set of deep learning neural networks are specific to the same domain;

providing an input to the set of deep learning neural networks, wherein responsive to the input, one or more of the deep learning neural networks within the set of deep learning neural networks produces an output;

inputting the output of the one or more deep learning neural networks into a case-based reasoning (CBR) system;

generating an output of the CBR system responsive to the input received by the CBR system if the input received by the CBR system is known by the CBR system, wherein the input received by the CBR system is known by the CBR system if the input received by the CBR matches each situational predicate of at least one case stored in the CBR system;

determining that the output of the CBR system is a correct output; and training one of the deep learning neural networks on the correct output if the correct output is specific to the particular one of the deep learning neural networks.

11. The method of claim 10 further comprising the step of selecting a single deep learning neural network at random from the set of deep learning neural networks for training to acquire an input object definition if the input received by the CBR system is not known by the CBR system.

12. The method of claim 10, wherein the output of the CBR system includes fused outputs of the set of deep learning neural networks and directives to train one or more of the set of deep learning neural networks on specified outputs.

13. The method of claim 10 further comprising the step of subsequent to the training of one of the deep learning neural networks, repeating the step of inputting the output of the one or more deep learning neural networks, along with directive(s), into a CBR system.

14. The method of claim 10, wherein the output of the CBR system generated responsive to the input received by the CBR system is a mapped set of orthogonal subnets.

15. The method of claim 10, wherein the step of determining that the output of the CBR system is a correct output is performed by receiving feedback from a user of the CBR system.

16. A system comprising:
a processor having a set of deep learning neural networks implemented therein, wherein no pair of deep learning neural networks within the set of deep learning neural networks produces a semantically equivalent output by design, wherein a fundamental memory of each deep learning neural network within the set of deep learning neural networks is below a fundamental memory threshold for the respective deep learning neural network, wherein each of the deep learning neural networks within the set of deep learning neural networks has more than one hidden layer, wherein each of the deep learning neural networks within the set of deep learning neural networks are specific to the same domain, wherein the set of deep learning neural networks is configured to receive an input, wherein responsive to the input one or more of the deep learning neural networks within the set of deep learning neural networks produces an output; and a case-based reasoning (CBR) system implemented within the processor, the CBR system configured to receive, as input, the output of the one or more deep learning neural networks, the CBR system further configured to generate an output of the CBR system responsive to the input received by the CBR system if the input received by the CBR system is known by the CBR system, wherein the processor is configured to determine that the output of the CBR system is a correct output and further configured to train one of the deep learning neural networks on the correct output if the correct output is specific to the particular one of the deep learning neural networks.

17. The system of claim 16, wherein the processor is further configured to select a single deep learning neural network at random from the set of deep learning neural networks for training to acquire an input object definition if the input received by the CBR system is not known by the CBR system.

18. The system of claim 16, wherein the output of the CBR system includes fused outputs of the set of deep learning neural networks and directives to train one or more of the set of deep learning neural networks on specified outputs.

19. The system of claim 16, wherein the processor is configured to generate a mapped set of orthogonal subnets as the output of the CBR system responsive to the input received by the CBR system.

20. The system of claim 16, wherein processor is configured to determine that the input received by the CBR system is known by the CBR system if the input received by the CBR matches each situational predicate of at least one case stored in the CBR system.

* * * * *